United States Patent [19]

Wiggs

[11] Patent Number: 4,590,386

[45] Date of Patent: May 20, 1986

[54] PIGGY BACK WATER POWER GENERATOR

[76] Inventor: B. Ryland Wiggs, 3630 Villanova Ct., Bethlehem, Pa. 18017

[21] Appl. No.: 652,841

[22] Filed: Sep. 21, 1984

[51] Int. Cl.$^4$ ............................................... F03B 7/00
[52] U.S. Cl. ................... 290/54; 416/247 A
[58] Field of Search .................. 290/43, 54; 415/2, 7; 416/9, 85, 247 R, 247 A

[56] References Cited

U.S. PATENT DOCUMENTS

| | | | |
|---|---|---|---|
| 928,782 | 7/1909 | Morrison | 416/247 A |
| 1,780,584 | 11/1930 | Fachnie | 416/247 A |
| 4,104,536 | 8/1978 | Gutsfeld | 290/54 |
| 4,270,056 | 5/1981 | Wright | 290/54 |

FOREIGN PATENT DOCUMENTS

| | | | |
|---|---|---|---|
| 2730735 | 1/1979 | Fed. Rep. of Germany | 415/7 |
| 1005948 | 4/1952 | France | 416/85 |

*Primary Examiner*—William M. Shoop, Jr.
*Assistant Examiner*—W. E. Duncanson, Jr.

[57] ABSTRACT

A water power apparatus, composed of independent design features, which provides for: (1) utilization of a central boat with two paddle wheels and respective side stabilizers, with one wheel being located on each respective side of the boat, connected by a central axle or a flexible coupling; (2) two respective and connected sets of paddle wheels, with the blades on each of the two respective wheels placed 90° apart, with each set of wheels being situated a lateral distance, apart from the other, of at least one-half the width of a respective paddle wheel blade, and with the blades on one wheel set being staggered 45° from the other; (3) an "angled" front deflection screen with cord or rods running parallel to the water surface; (4) a paddle wheel blade surface area extended above the water surface, with fully enclosed sides, so as to totally capture all water "head" created against the blade by the current flow; and (5) "legs", with cone-shaped bottoms, for the generating vessel to rest on, preventing bottom jamming of the paddle wheels during periods of low water levels.

4 Claims, 6 Drawing Figures

PIGGY BACK WATER POWER GENERATOR

SUMMARY OF THE INVENTION

This invention relates to an actual, working, hydraulic generating machine which may be used to generate mechanical power and/or electricity from a boat or vessel moored or anchored in a stream or current of water.

Additionally, independent objects of this power generating system are to provide relatively continuous and smooth revolutions of the paddle wheels in conjunction with optimum actual operating efficiency; to provide self-cleaning ice and/or depris protection; to provide paddles which capture artificial water "head" and which prevent swamping of the supporting vessel; and to provide a means of supporting the entire generating vessel in periods of low water.

The present invention differs from other related inventions in a number of substantial and basic respects. The differing aspects are discussed categorically as follows:

(1) No U.S. Patents of record show utilization of a central boat with a single paddle wheel on each respective side. See, inter alia, U.S. Pat. Nos. 4,352,990; 4,301,377; 4,270,056; 1,439,848; and 1,200,693 where the working paddle wheels are centrally located and the gearing and/or generators are designed to be situate on the side or at the rear. Additionally, see U.S. Pat. No. 1,368,454 and see Int. Cl$^3$. F03B17/06, B63B35/02, where working paddle wheels are located in front and in back of each other, respectively.

The proposed subject design, with a central boat utilizing a single identical paddle wheel on each respective side is more efficient for the following reasons: (a) the heavy gearing and/or machinery and/or generator is centrally located, permitting equal weight distribution and enhancing stability and anchoring of the total generating vessel in the water; and (b) the area beneath the central boat, between the two respective paddle wheels, provides a central free-flow buffer area for water deflected to the side off of each respective paddle, thereby preventing respective angled water flow interference (and resulting loss of power) and allowing only the direct current flow to hit the actual paddle surface area.

It is important that the paddle wheels not be placed directly in each other's path (one directly in front of the other) as contemplated by the aforesaid U.S. Pat. No. 1,368, 454 and by the aforesaid Int. Cl$^3$. F03B17/06, B63B35/02, because the forward paddle wheel slows the water speed as energy is exerted, and the rear paddle wheel will, consequently, operate at substantially less than its potential in the unhindered normal current flow.

It is also important that the paddle wheels not be placed directly side by side, in staggered positions, as contemplated by the aforesaid U.S. Pat. No. 4,270,056, because water will always be deflected at an angle from the forward paddle into its adjacent paddle to its rear. Such deflected water flow disturbs the direct and right angled optimum flow into the rear paddle, thus resulting in a loss of potential power and efficiency. Factually, testing has shown the respective staggered wheels should generally be spaced at least one-half paddle wheel width apart for efficient operation.

Lastly, unlike all the other aforesaid U.S. Patent paddle wheel designs, it is important that more than one centrally located paddle wheel be used. By using only one central paddle, the user will either suffer a substantial loss of potential energy via utilizing a large number of paddles around his central axel (the more paddles used, the less energy produced), or the user will run the risk of stalling his wheel when using a lesser number of paddles when maximum energy production is required (the fewer the number of paddles, the greater the span between paddles situate at exactly a right angle to the water flow, where maximum energy production occurs, and the greater the risk of the actual stopping of the wheel due to lack of flow against right angled, or close to right angled, paddle surface area under a full power load).

(2) No U.S. Patents of record show and/or claim utilization of two respective paddle wheels, with a buffer zone in between, with each respective wheel utilizing four paddles, equally spaced at 90° angles, and respectively staggered around a central axel. Please refer to all of the above-reference patents.

The eight paddles, spaced at 45° apart, as shown on the aforesaid U.S. Pat. Nos. 1,439,848 and 1,200,963, are too numerous and, while reducing the risk of stalling, they substantially reduce potential power efficiency.

The three paddles, spaced at 120° apart, as shown on the aforesaid U.S. Pat. No. 4,270,056, are too few and, while increasing potential power efficiency, they substantially increase the risk of stalling. This is possibly why two staggered sets of side by side 120° spaced paddles were contemplated. However, while positioning the paddles in one adjacent group, so they bisect the angles formed by the blades in the directly adjacent group, will help prevent stalling, as aforesaid, the resulting deflected water flow, via having the two sets side by side, will reduce potential efficiency of the total paddle area exposed to the right-angled water flow. Additionally, under a full power load, the distance between any two such 60° staggered blades is too great so as to insure prevention of stalling, and the revolutions, if made, will be in a jerky, rather than smooth, fashion inhibiting effective utilization of power.

In fact, lengthy and detailed testing has shown the optimum number of paddle wheel blades to be those contemplated and shown herein. Namely, four paddles, spaced 90° apart, with two such sets of paddle wheels staggered at 45° and coupled together, but with sufficient distance (at least one-half paddle wheel blade width) in between the two sets for water deflected from one set not to affect the other. Additionally, this number and combination of paddle wheels is sufficient to safely prevent stalling under full power output, and to simultaneously and uniformly (without excessive jerking) extract a maximum amount of energy from the current flow absent hinderance from an excessive number of paddle blades.

(3) No U.S. Patents of record shown and/or claim utilization of an "angled" deflection screen.

While the aforesaid U.S. Pat. No. 1,368,454 utilizes the concept of a debris screen, nowhere is the screen shown and/or claimed to be angled. In fact, a flat debris screen, at a right angle to the current will eventually clog up with floating debris and/or ice, thereby reducing and/or totally stopping power output from the waterwheels.

Consequently, in order to prevent such a situation, the screen must be angled so as to allow the current to push debris along the screen and off to the side of the generating vessel. Thus, an angled debris screen will be continuously self-cleaning.

Additionally, the screen must extend below and above the water surface so as to deflect debris and so as to provide a safety barrier for boaters. The screen should consist of a small diameter, but strong, bar, cord, or wire. The bar or cord must be small enough so as not to significantly interrupt the current flow approaching the paddle wheels, but strong enough to withstand the impact of ice flows.

Lastly, the screen should have no vertical cords or bars. The screen should consist of a number of cords or bars stretched in a horizontal fashion from the central front forward point to the extreme side of a respective paddle wheel. The inclusion of vertical cords or bars, as contemplated in the above-referenced patents of record, will tend only to catch branches and other irregularly shaped objects, resulting in restriction and/or blockage of water flow.

(4) No U.S. Patents of record show and/or claim the extension of the paddle wheel surface, and the side enclosure of same, to a sufficient height above the normal water level so as to insure capture of the "head" of water which will always be artifically created by the current rushing against a respective paddle.

While U.S. Pat. No. 1,439,848 contemplates cupping the lower portion of paddle wheel blades when using falling water, the paddles are contemplated as being "opened" and submerged when solely utilizing current.

Detailed testing has shown it to be advantageous to extend the paddle surface area to a sufficient height above the actual water surface elevation so as to capture the entire "head" of water which results from the current flow encountering the paddle and from the current simultaneously pushing itself in an upward (as well as sideways) manner. Additionally, the heightened paddle surface area's respective sides must be fully enclosed. The heightened and enclosed paddle surface area is important for three reasons.

The first reason is that the captured "head" adds weight to the falling paddle blade and helps push it down. The second reason is that if any portion of the head were allowed to escape over, or around, its respective paddle blade, it would add weight to the opposite paddle blade on its way out of the water, and potential efficiency and power would be substantially reduced. The third reason is that the head, if not contained, would swamp the adjacent boat in a strong current.

(5) No U.S. Patents of record show and/or claim "legs" for the generating vessel and/or machine.

Legs are important, and are a necessity for practical operation in rivers or tidal areas. Without legs, in periods of low water, the paddle wheel blades would simply jam into the bottom of the river, or tidal area, and stop.

Legs affixed to the perimeters, with cone-shaped bottoms, extending slightly beyond paddle wheel depth, will support the generating vessel in periods of low water, allowing the paddle wheels to continue to turn. The legs will simply rise and float with the vessel during periods of normal high water flows. Cone-shaped bottoms on each respective leg will assist in preventing the legs from sticking in mud or sand.

DETAILED DESCRIPTION OF THE DRAWINGS

Figure 1:
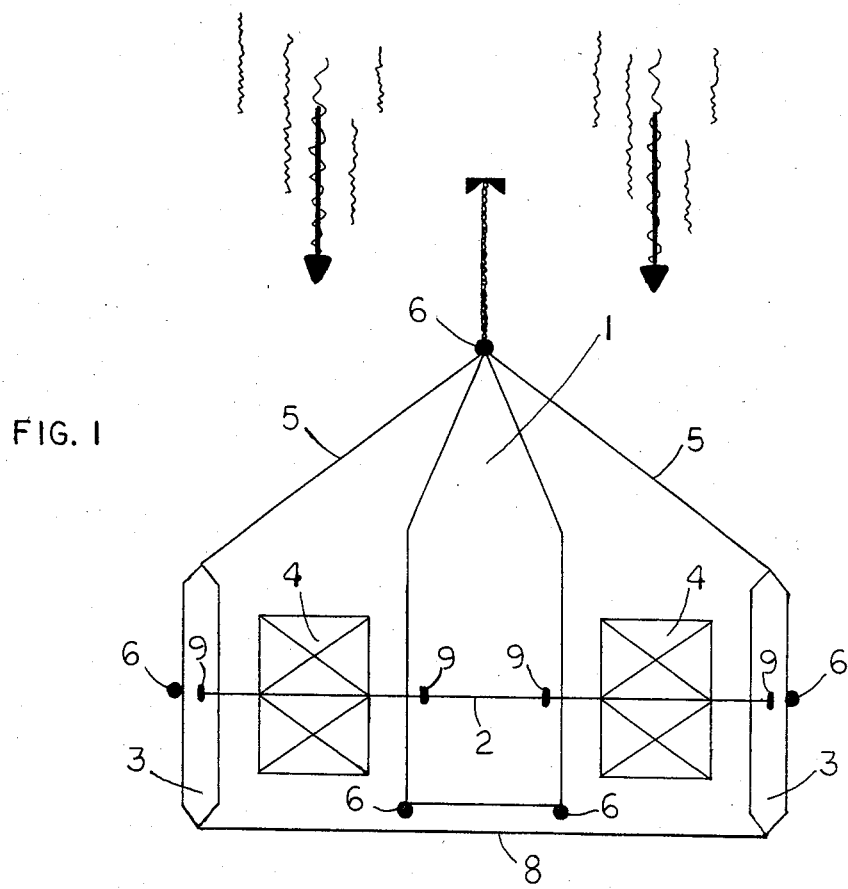
FIG. 1 is a complete top view.

FIG. 1 shows a boat, or vessel, 1 anchored in a current of water (depicted by enlongated arrows). The vessel 1 has been equipped with complete "Piggy-Back" power generating apparatus.

The equipment consists of one central axle 2 straddling the back of the vessel 1, mounted on pillow block bearings 9, with side stabilizers 3 consisting of plastic or metal clad styrofoam or other flotation.

The axle 2 is turned via water flow pushing against the respective paddle wheels 4 which are separated by a distance of at least one-half their respective width to minimize or prevent angled side water flow deflection from one to the other. The mechanical energy generated is conveyed to power generating equipment via gearing positioned on the central axle or on the interior side of each respective paddle wheel. The power can then be transmitted to appropriate on-board power generating equipment.

For safety purposes, as well as for debris and ice protection, an "angled" front debris screen 5 is fastened from the forward center of the vessel to the extreme respective end of each paddle wheel. Angling the screen, which will consist of rods or cord or wire solely running parallel to the water surface, will create a self-cleaning effect and prevent debris build up and/or water flow blockage. A rear above-water safety screen 8 is also shown.

To prevent the paddle wheels from jamming into the bottom of the river or other sub-surface ground during periods of low water levels, legs 6 are attached to support the entire generating vessel.

Figure 2:
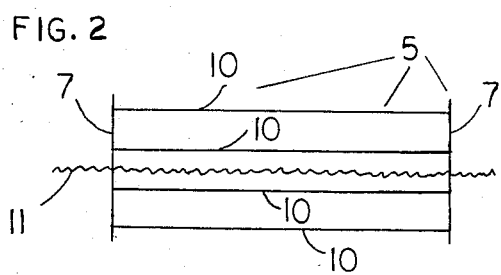
FIG. 2 is a side view of the angled debris screen.

FIG. 2 depicts a side view of the front angled debris screen 5, which, as aforesaid, will consist of rods or cord or wire 10 solely running parallel to the water surface 11. The rods or cord 10 will be placed both above and below the water line 11 for dual purposes of safety and equipment protection. The rods or cord 10 will be affixed to vertical rods 7 situated solely at the respective extreme ends. This will prevent branches or other debris from snagging and restricting water flow.

Figure 3:
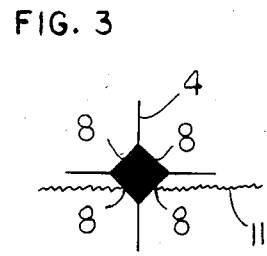
FIG. 3 is a side view of a paddle wheel.

FIG. 3 shows a side view of one respective paddle wheel 4 with fully enclosed top sides 8 designed to capture and efficiently use the artificial water "head" created by the current pushing upwards against the paddle wheel blades. The top side enclosures 8 are also designed to prevent detrimental overflow of the head onto opposite paddle wheel blades as well as to prevent potential swamping of the central boat. The top side enclosures 8 must extended below the normal surface water elevation 11.

Figure 4:
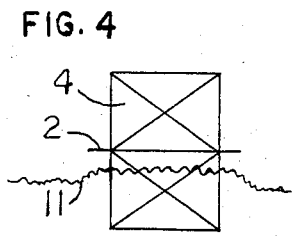
FIG. 4 is a front view of a paddle wheel.

FIG. 4 shows a front view of one respective paddle wheel 4, the surface area of which has been extended above the water line 11 to the axle 2 so as to capture and prevent water "head" overflow, as well as to utilize the additional weight of same.

Figure 5:
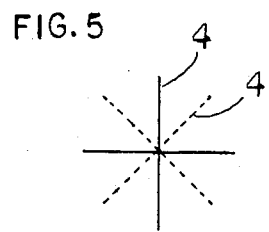
FIG. 5 is a side view of both paddle wheels.

FIG. 5 shows a side view of the two sets of paddle wheels 4 as same would individually appear without the aforesaid top side enclosures as shown hereinabove in FIG. 3. There are four blades on each respective paddle wheel placed at 90° angles to one another. The blades on one paddle wheel (shown in solid lines) are staggered so the second set of paddle wheel blades on the far end of the axle (shown in broken lines) are situated at 45° angles to the first set.

Figure 6:
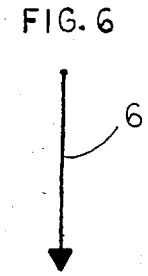
FIG. 6 is a side view of a generating vessel support leg.

FIG. 6 shows a side view of the cone-bottom legs 6 designed to support the entire generating vessel during periods of low water levels, thus preventing the paddle wheels from jamming into the bottom and stopping.

I claim:

1. A power generating system including a central, watertight, floating boat containing gearing and an electric generator; two watertight, floating outrigger pontoons smaller in size than the central boat; two paddle wheels with one respective paddle wheel on each side of the central boat, with each respective paddle wheel having four flat blades spaced 90° apart, each blade having a solid surface area from the central connecting axle to the extremities of each blade, with each respective paddle wheel's four blades being offset 45° from the other paddle wheel's four blades, with the spacing between the paddle wheels being a minimum of one-half the width of the blades; with each respective wheel's central axle being situation high enough above the water surface to capture all of the incoming water's head build up, in conjunction with the sides of each respective paddle wheel being enclosed from the central axle to a point at or near the outside extreme end of each respective paddle wheel; and with a shaft connecting both paddle wheels to the generator via gearing.

2. The power generating system as in claim 1, wherein the outrigger pontoons and central boat are equipped with legs with cone shaped bottoms for the purposes of protecting the paddle wheel blades in low water, protecting against sinking in mud or sand, and for ease of withdrawal from the bottom as the water rises.

3. The power generating system as in claim 1, with a forward angled-back deflection screen with protective cables or bars running parallel, not vertical, to the water's surface, located below the water surface for protection from ice and debris, and located above the water surface for protection of rafters or boaters, extending from the center bow of the central boat to the outermost forward point of each respective outrigger pontoon.

4. The power generating system as in claim 1, with a stern, or rear, non-angled deflection screen with protective cables or bars running parallel, not vertical, to the water's surface, located solely above the water surface, for protection of boaters, extending from the stern, or rear, of one respective outrigger pontoon to the stern, or rear, of the other respective outrigger pontoon, extending either behind, through, or across the stern, or rear, of the central boat.

* * * * *